(12) United States Patent
Marchese

(10) Patent No.: US 9,521,357 B2
(45) Date of Patent: Dec. 13, 2016

(54) SYSTEM AND METHOD FOR STREAMING AND RECORDING VIDEO

(71) Applicant: Joseph Robert Marchese, Ray, MI (US)

(72) Inventor: Joseph Robert Marchese, Ray, MI (US)

(*) Notice: Subject to any disclaimer, the term of this patent is extended or adjusted under 35 U.S.C. 154(b) by 24 days.

(21) Appl. No.: 14/509,715

(22) Filed: Oct. 8, 2014

(65) Prior Publication Data
US 2016/0105634 A1 Apr. 14, 2016

(51) Int. Cl.
*H04N 5/91* (2006.01)
*H04N 9/804* (2006.01)

(52) U.S. Cl.
CPC .............. *H04N 5/91* (2013.01); *H04N 9/8042* (2013.01)

(58) Field of Classification Search
None
See application file for complete search history.

(56) References Cited

U.S. PATENT DOCUMENTS

| 6,891,566 B2 | 5/2005 | Marchese |
| 2007/0237141 A1 | 10/2007 | Marchese |
| 2008/0253449 A1* | 10/2008 | Shimizu ............... H04N 19/159 375/240.03 |
| 2010/0254673 A1* | 10/2010 | Begen ................ H04N 7/17318 386/239 |
| 2010/0287566 A1* | 11/2010 | Hauser .................... G06F 9/542 719/318 |
| 2013/0294749 A1* | 11/2013 | Burns ...................... H04N 9/87 386/278 |

* cited by examiner

*Primary Examiner* — Eileen Adams
(74) *Attorney, Agent, or Firm* — Brooks Kushman P.C.

(57) ABSTRACT

In at least one embodiment, a method and a computer system for implementing the method are provided. The method may include streaming temporal video to obtain a streamed temporal video having a current incomplete segment and dynamically buffering the current incomplete segment to store data associated thereto and a current incomplete segment buffer. The method may further include receiving first and second inputs to obtain start and end time markers for a first video segment and continuously recording the streamed temporal video based on receipt of the first input and until receipt of the second input to obtain a raw recorded first video segment. A recorded first video segment may be generated based on the raw recorded first video segment and the current incomplete segment data. The method may be used to generate recordings of discontinuous events from streaming video, for example, individual plays during sporting events.

23 Claims, 11 Drawing Sheets

SYSTEM AND METHOD FOR STREAMING AND RECORDING VIDEO

TECHNICAL FIELD

One or more embodiments relate to a system and method for streaming and recording video, for example, of sporting or other events.

BACKGROUND

Watching film following an athletic event is a common practice in many sports and activities. The game film may allow coaches and athletes to see what went right or wrong during a certain play or portion of an event. Coaches and athletes may then use the information gained to change their practice and training, their strategy for the next event, or make other adjustments. During an event, some athletes and sports teams may take still photographs that may then be printed or shown to the players and coaches. These still photographs may help visualize formations and isolated incidents, but they do not provide the volume of information that video does.

SUMMARY

In at least one embodiment, a computer system is provided for recording a number of segments of a discontinuous activity. The system may comprise a computer having non-transitory memory for storing machine instructions that are to be executed by the computer, the machine instructions when executed by the computer implement the following functions: streaming temporal video of the discontinuous activity to obtain a streamed temporal video having a current incomplete segment; dynamically buffering the current incomplete segment to store data associated thereto and a current incomplete segment buffer; receiving first and second inputs to obtain start and end time markers for a first segment of the number of segments; continuously recording the streamed temporal video based on receipt of the first input and until receipt of the second input to obtain a raw recorded first video segment; and generating a recorded first video segment based on the raw recorded first video segment and the current incomplete segment data.

The functions may further include buffering header information of the streamed temporal video and including the header information in the recorded first video segment. Dynamically buffering may include buffering an I-frame and one or more P-frames comprised of a number of P-frames. The I-frame may have an associated I-frame time marker and the one or more P-frames may have one or more associated P-frame time markers and the P-frames having associated time markers between the I-frame and the start time marker may be included in the current incomplete segment. In one embodiment, only a most recent I-frame relative to the start time marker is dynamically buffered. The functions may further comprise clearing the current incomplete segment buffer when a new I-frame is generated. Dynamically buffering may include expanding or contracting the size of the current incomplete segment buffer based on the size of or the number of P-frames. The functions may further comprise returning the size of the current incomplete segment buffer to an initial size after it has been cleared. The functions may further comprise adjusting a time offset of the recorded first video segment.

In at least one embodiment, a method is provided. The method may include streaming temporal video to obtain a streamed temporal video having a current incomplete segment; dynamically buffering the current incomplete segment to store data associated thereto and a current incomplete segment buffer; receiving first and second inputs to obtain start and end time markers for a first video segment; continuously recording the streamed temporal video based on receipt of the first input and until receipt of the second input to obtain a raw recorded first video segment; and generating a recorded first video segment based on the raw recorded first video segment and the current incomplete segment data.

The method may further comprise buffering header information of the streamed temporal video and including the header information in the recorded first video segment. Dynamically buffering may include buffering an I-frame and one or more P-frames comprised of a number of P-frames. The I-frame may have an associated I-frame time marker and the one or more P-frames may have one or more associated P-frame time markers and the P-frames having associated time markers between the I-frame and the start time marker may be included in the current incomplete segment. In one embodiment, only a most recent I-frame relative to the start time marker is dynamically buffered. The method may further include clearing the current incomplete segment buffer when a new I-frame is generated. Dynamically buffering may include expanding or contracting the size of the current incomplete segment buffer based on the size of or the number of P-frames. The method may further include returning the size of the current incomplete segment buffer to an initial size after it has been cleared. The method may further include adjusting a time offset of the recorded first video segment.

In at least one embodiment, a method of recording and distributing a number of segments of a sporting event is provided. The method may include: streaming temporal video of the event to obtain a streamed temporal video having a current incomplete segment; dynamically buffering the current incomplete segment to store data associated thereto and a current incomplete segment buffer; receiving first and second inputs to obtain start and end time markers for a first video segment, the start and end time markers being associated with a start and end of a segment of the event; continuously recording the streamed temporal video based on receipt of the first input and until receipt of the second input to obtain a raw recorded first video segment; generating a recorded first video segment based on the raw recorded first video segment and the current incomplete segment data; and distributing the recorded first video segment to a remote device over a network.

In one embodiment, dynamically buffering includes buffering an I-frame and one or more P-frames and the method further includes clearing the current incomplete segment buffer when a new I-frame is generated.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
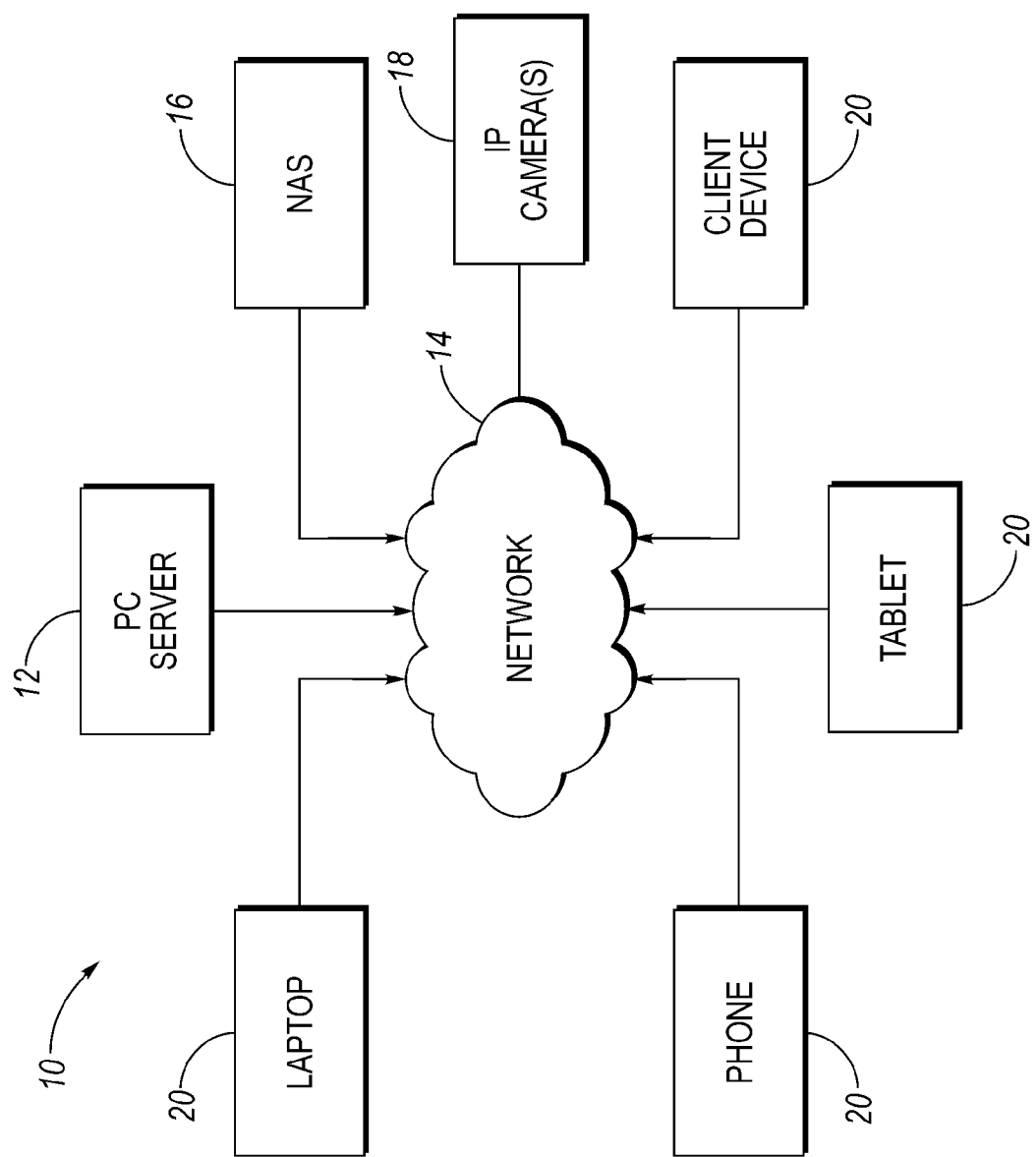
FIG. 1 is a schematic of a network and devices connected to the network, according to an embodiment.

With reference to FIG. 1, a system 10 is provided for streaming and recording video. The system 10 may include a computer server 12, for example, a PC web server having a display and a user input device such as a mouse and keyboard or a touch-screen. The system may be connected to a network 14, which may be wired and/or wireless. The network 14 may be a local network or a larger, public network, such as the Internet. The system 10 may further include network-attached storage (NAS) 16 to store and share files with devices on the network 14. One or more network IP cameras 18 may be included in the system 10 and connected to the network 14. In addition to, or instead of IP cameras, analog cameras connected to an IP encoder may also be included in the system 10. The system 10 may also include one or more client devices 20 connected to the network 14. The client devices 20 may include PCs, laptops, smartphones, tablets, media players, or any other network-capable devices. The system 10 may also include additional components, such as those disclosed in U.S. Pat. No. 6,891,566 and U.S. Patent Application Publication No. 2007/0237141, the disclosures of which are hereby incorporated in their entirety by reference herein.

Software may be stored in a recording medium on a PC or other computing platform within the system 10, or any other device with recording capabilities. In one embodiment, the software is stored on the PC web server 12. However, the software may also be stored on one or more of the client devices 20. The software may also be stored on the IP camera(s) 18 and recordings may be stored on local memory on the camera(s) 18. The recordings may then be pulled or pushed to the server 12 or client devices 20. The software may include a user interface 30, shown in FIGS. 2-6. In one embodiment, the user interface may include a top menu bar 32 with numerous feature options. One or more viewing windows 34 may be provided for viewing video feeds from the one or more IP cameras 18. The software may further include an input, such as a Start Streaming button, to initiate streaming of video from the one or more cameras 18 and an input, such as a Stop Streaming button, to terminate streaming of the video. The Start Streaming and Stop Streaming buttons may be the same (i.e., Start/Stop). The software may also include inputs to start and stop recording of the streaming video, such as separate or combined Start and Stop Recording buttons 36. The inputs to start and/or stop the streaming or recording may include any suitable input method, such as on-screen button(s) that may be clicked or pressed, text commands, gestures, or others. In addition, the input to start/stop may be received from a remote device via a network message from an IP-enabled device (e.g., smart phone, tablet, PC, etc.). In embodiments where a sporting or other event is to be recorded, a graphic 38 (e.g., a photo or representation/schematic) of the field of play, stage, or location of the event may be displayed. The software may further allow a user to select pan-tilt-zoom (PTZ) presets for adjusting the position of the one or more cameras. The presets may be accessed by a pull-down menu, joystick controller, mouse, or any other suitable user interface or method.

When the software application is launched, it may be in a static configuration, wherein no video is streaming or being recorded. If a user selects an input to start streaming, the IP cameras 18 may begin streaming video, which may be displayed in the one or more viewing windows 34. The video may be streamed at any suitable frame rate, for example, at 30 FPS. However, the frame rate may be set higher or lower, depending on the desired settings and/or the hardware or network capabilities. The frame rate may also be varied during the streaming.

Figure 2:
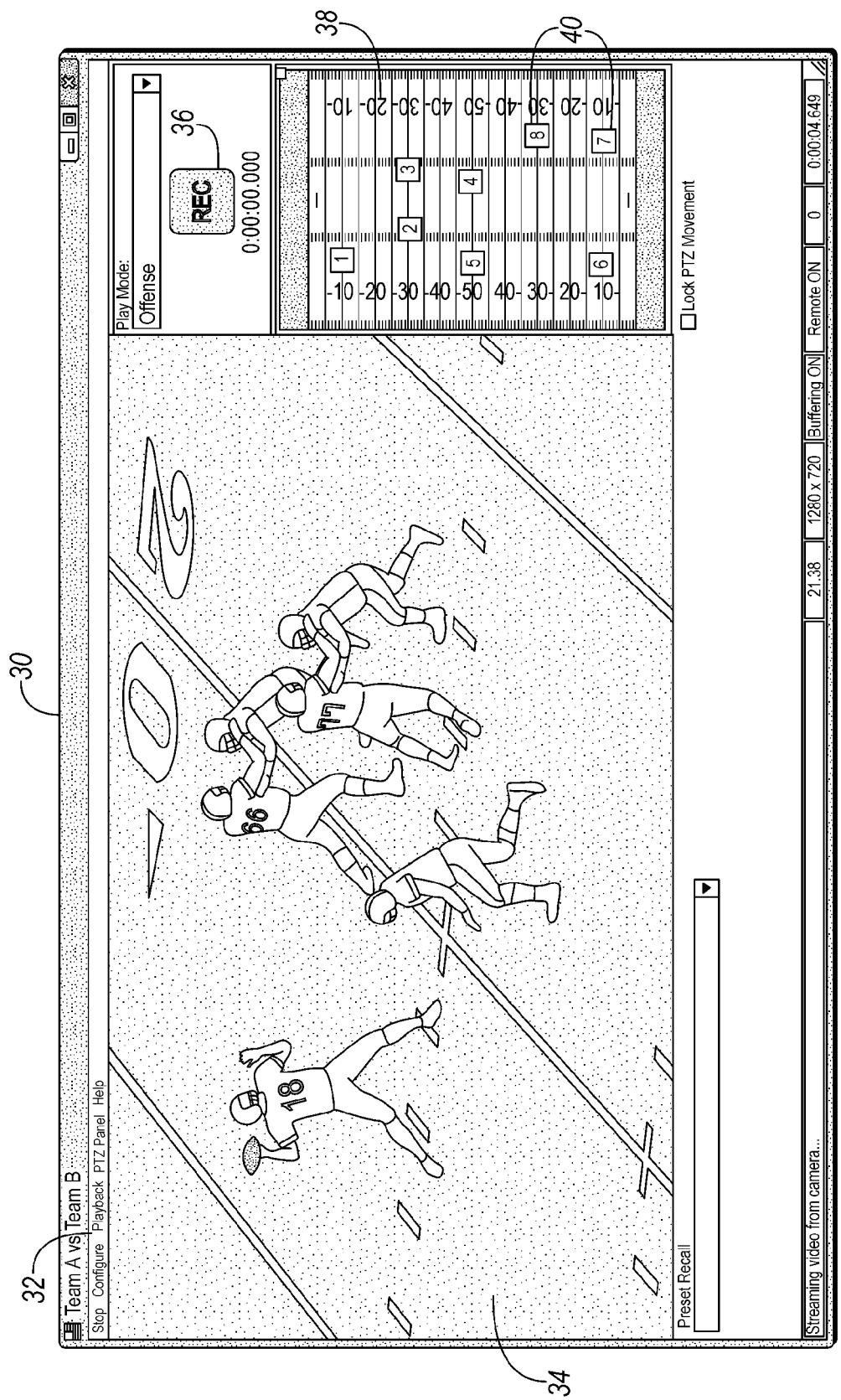
FIG. 2 is an embodiment of a user interface used for recording streaming video, according to an embodiment.
Figure 3:
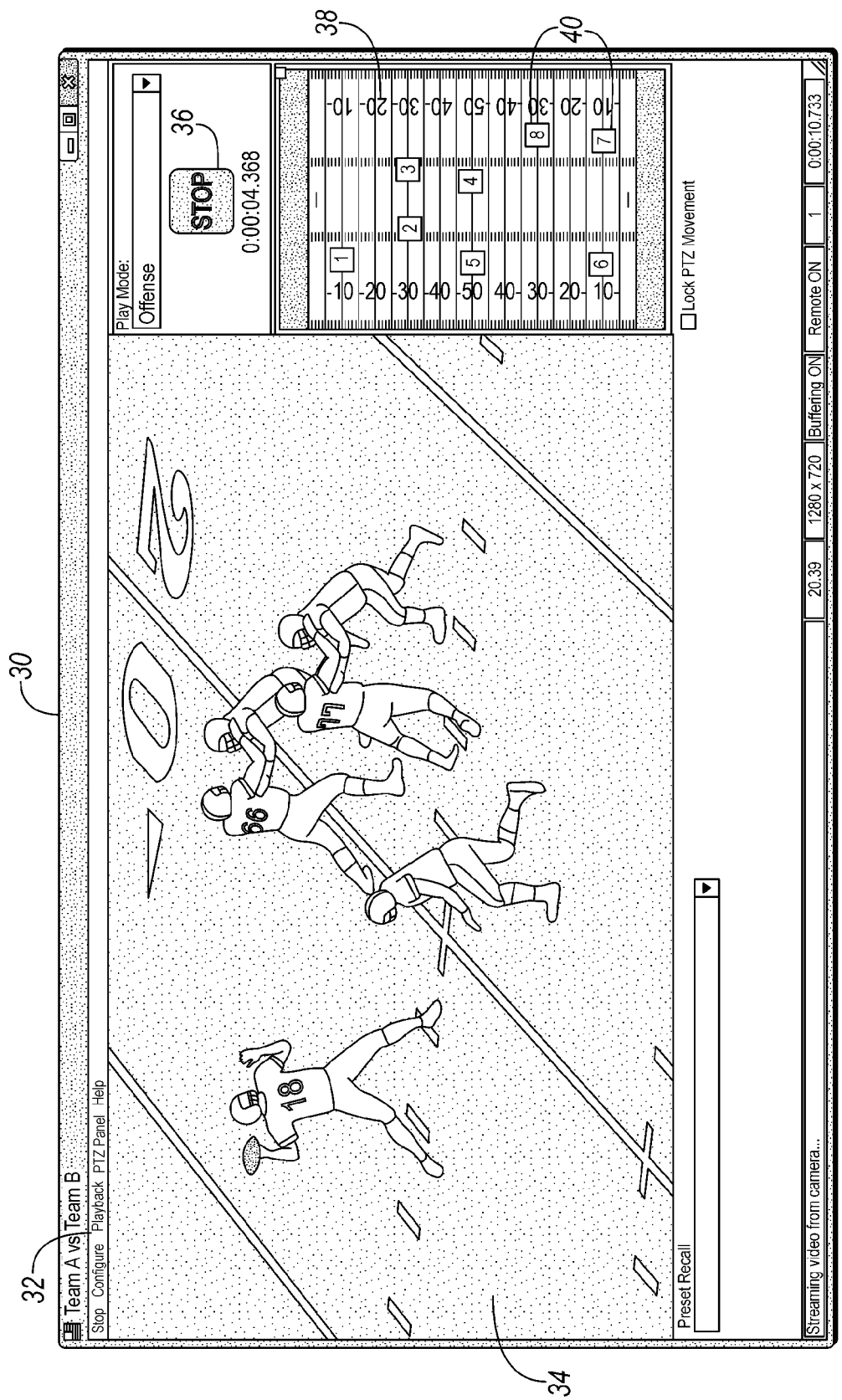
FIG. 3 is another embodiment of a user interface used for recording streaming video, according to an embodiment.
Figure 4:
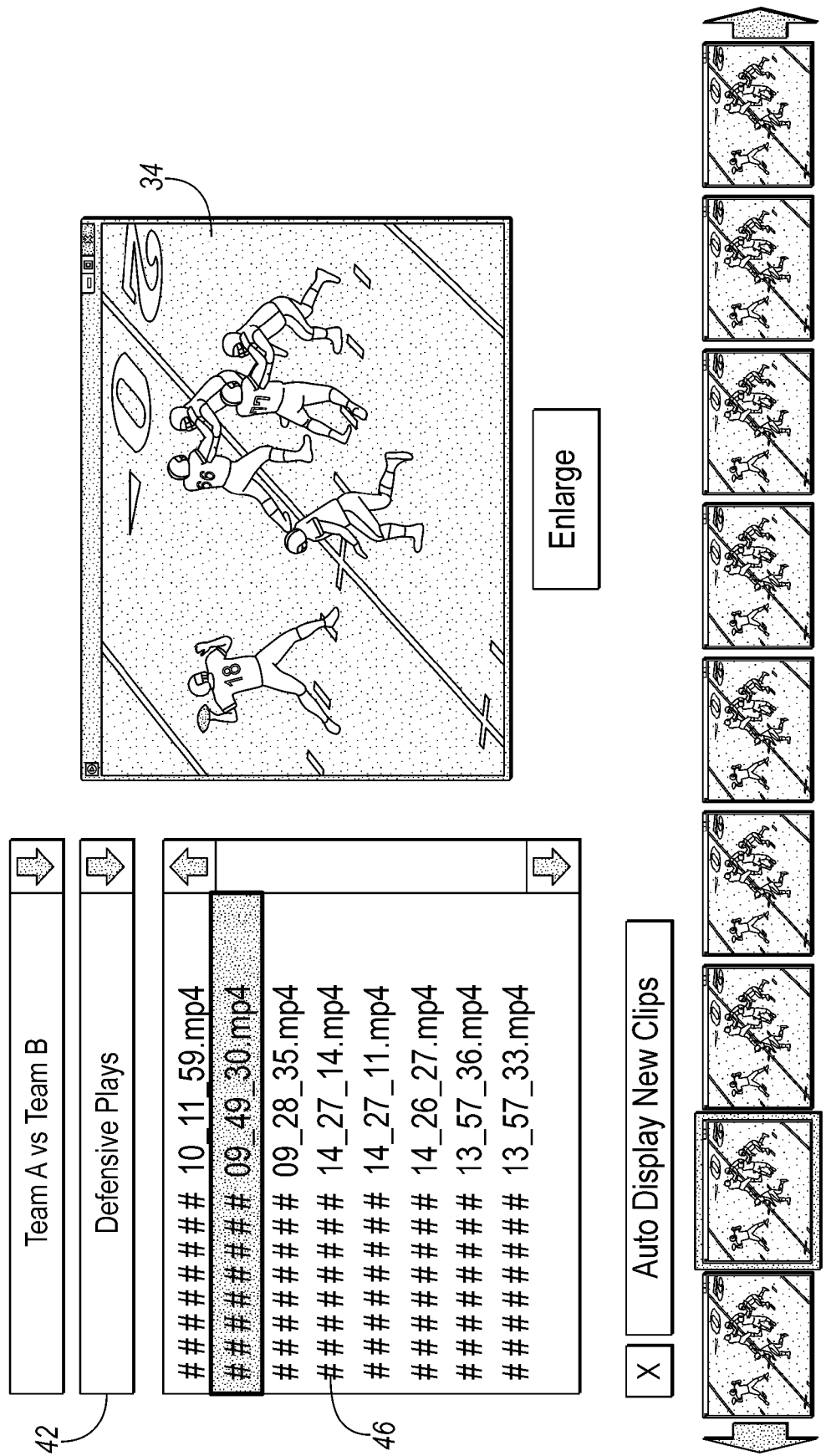
FIG. 4 is another embodiment of a user interface used for recording streaming video, according to an embodiment.
Figure 5:
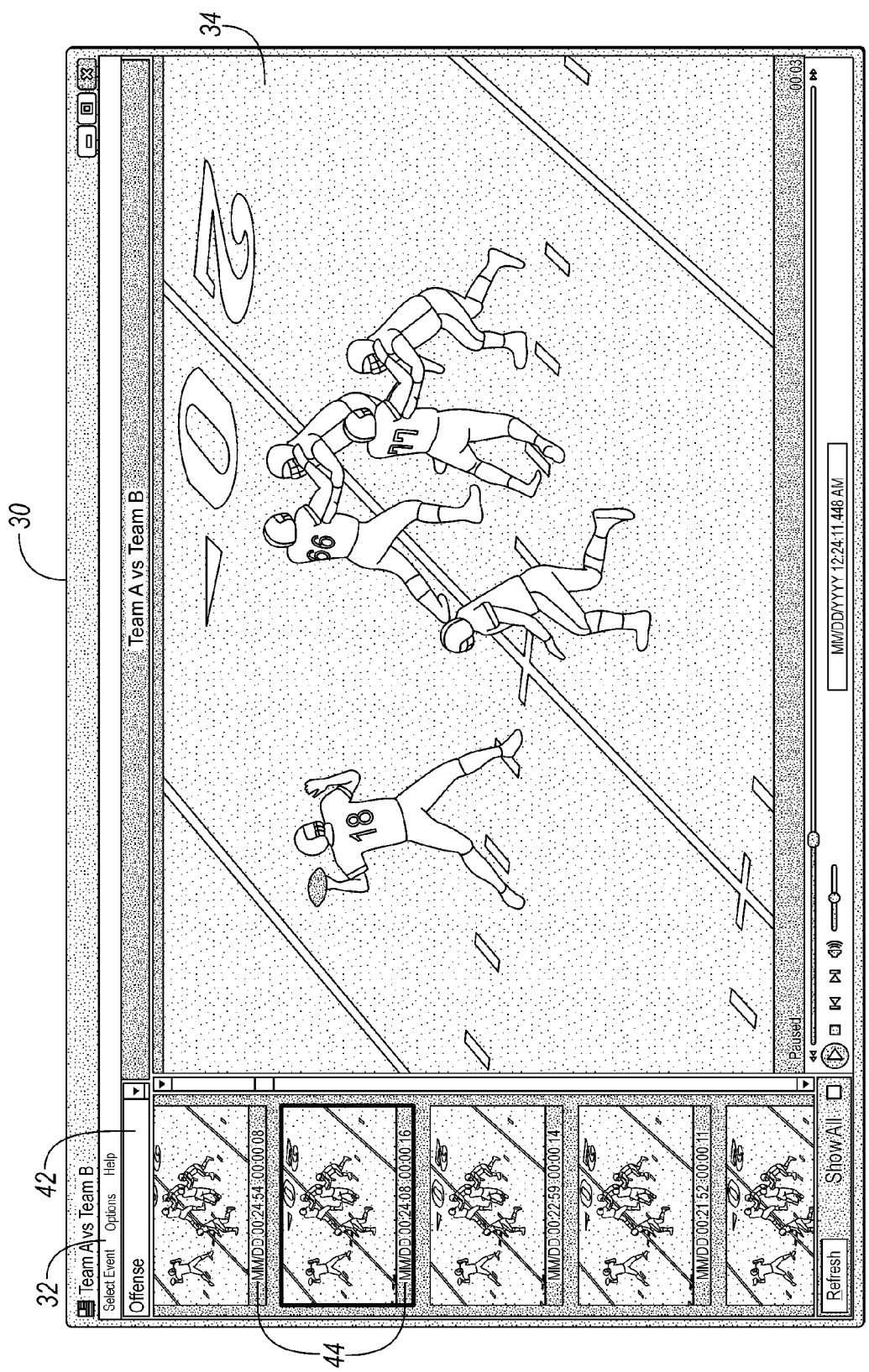
FIG. 5 is another embodiment of a user interface used for recording streaming video, according to an embodiment.
Figure 6:
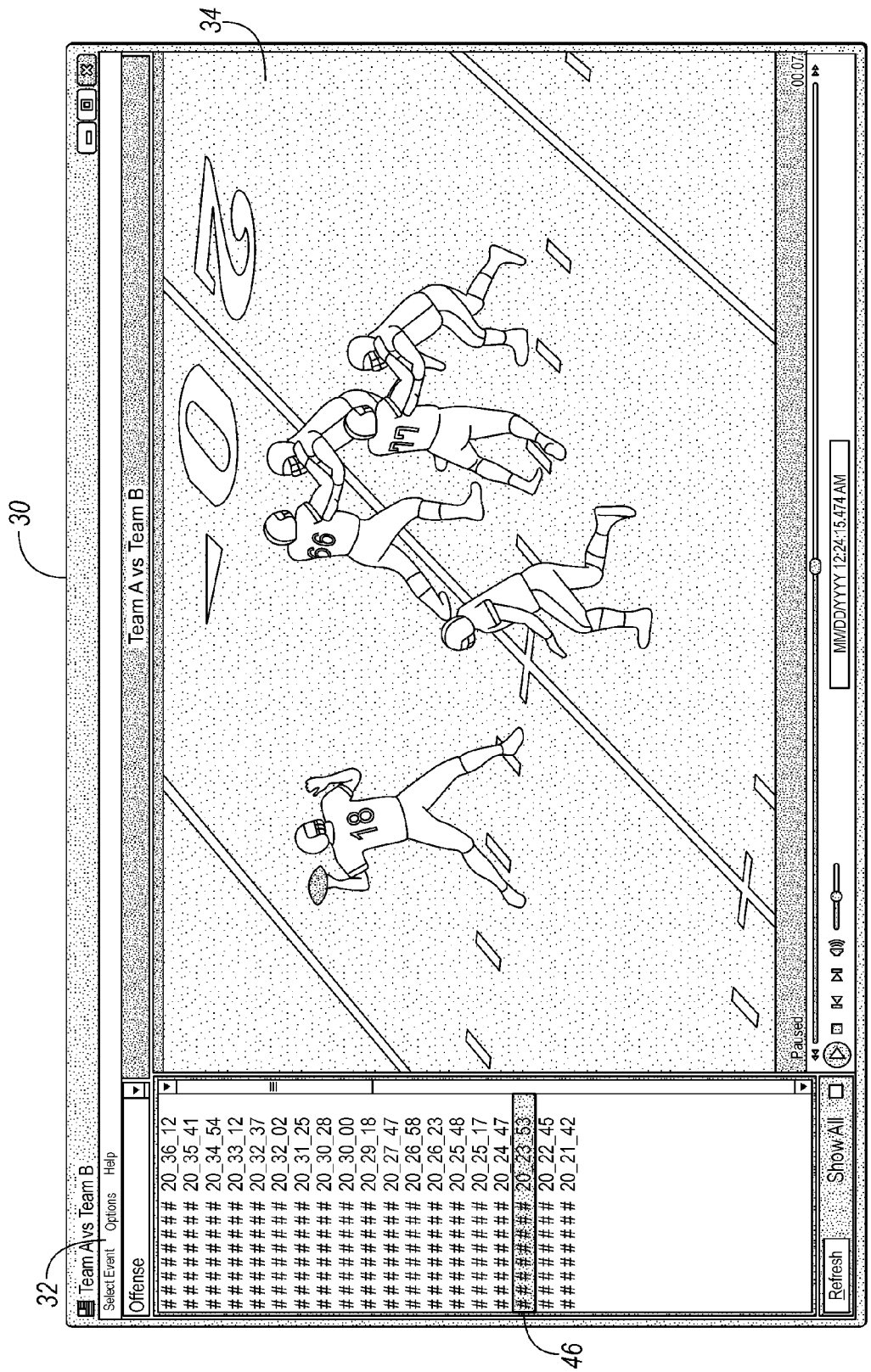
FIG. 6 is another embodiment of a user interface used for recording streaming video, according to an embodiment.

Each camera may have stored thereon preset position names and indices. For example, a camera may have a plurality of preset positions 40 on a field that may be labeled. The positions may be labeled by a name and/or number, for example, numbers 1-8 as shown in FIGS. 2-3. The preset locations may correspond to areas of increased activity or areas of importance for the sport or event being recorded. For example, the goal lines of a football field, to determine if a player has scored a touchdown or not. The software may poll the camera(s) 18 for the preset position names and indices and allow the user to select them. For example, the software may populate a pull-down menu including the position names and/or indices. The camera positions may also be shown visually on a graphic, such as a visual representation of the field of play or event space. A user may then select the preset by clicking or otherwise selecting the desired position (e.g., touching on a touch-screen).

The user interface may allow a user to select a play mode, for example, using a play mode pull-down menu 42 that may be populated with the modes of play. For a sporting event, the menu may include options such as Offense, Defense, Kicking, Special Teams, etc. The software may build a plurality of recording paths based on the play mode specified. These path(s) may reside on a single recording device, multiple devices, or any combination thereof. The recording path may also be based on a root path, which may be provided in a configuration file that the software reads during startup or another designated time.

Once streaming has been initiated by the user, streaming video may be displayed in the one or more viewing windows 34. Regardless of whether the software includes a viewing window, an operator may make inputs based on watching or listening to the live action of the event (e.g., in person, on TV, on radio, etc.). Alternatively, inputs may be made automatically without an operator, for example, based an automated time clock signal (e.g., a game clock) or on a fixed periodic basis. In addition to the streaming video itself, additional information may be displayed on screen, as well, such as resolution, FPS, a running date/time stamp, or other information. Once the user has video streaming, it may be left streaming for the duration of the game or event. Alternatively, the user could start and stop streaming throughout the event, for example, during breaks in the game (e.g., halftime or intermission) or during portions that do not require analysis or may be confidential. The user may adjust the camera(s) 18 during streaming. For example, the user may move the camera(s) 18 to one of the presets discussed above, click or select a location on the video display to center that spot to the center of the viewing window, zoom in or out, adjust the PTZ manually, use vectored movement, use automatic tracking, or make other adjustments to the cameras. A joystick, touch-screen, or other interface may also be provided for camera manipulation. A variety of camera and/or lens types may also be included in the system 10 and controlled by the user. For example, a static camera having a very wide field of view may be positioned and configured to view the entire playing field or event surface at once. A user may then select (e.g., by clicking) a portion of the playing field and a PTZ camera correlated to the static camera's position may move to the selected position for a more detailed, different, or up-close view.

When the first game or event action that a user desires to record is about to start (e.g., a football kickoff), the user may select the play mode (e.g., special teams) and then initiate recording. A recording status message with information such as elapsed REC time may be displayed. The live video is recorded to a recording medium, which may be local (e.g., PC server 12) or remote (e.g., on the network 12). In one embodiment, the recording medium may be located at the camera(s) 18. The recording medium may be any suitable recording medium, such as a disk drive, thumb drive, hard disk, solid state drive, NAS, optical media, local or remote RAM memory, or other capable recording media. The path recorded to may be derived from the root path, the game or event name, the play mode selected, or any other user-customized or default setting. The root path and game/event name may remain constant during any game or event until it ends.

When the game or event action ends (e.g., a player is tackled), the operator may click the REC button again, a STOP button, or otherwise instruct the software to stop recording. The video may then continue streaming, but without being recorded. The segment of recorded video may then be written to the specified directory, described above. The video segment may receive a hierarchical time stamp 44 and/or sequence number 46. The sequence number 46 may increment from 1 to the last play of the game and may be used as a prefix, suffix, or other positional data for the segment/file name. This may allow for a unified or consistent method of reference for end users analyzing plays or segments during the game/event, or after. The video segment may then be made available to users on client devices 20. The video segment may be available directly from the location at which it was generated, such as the local storage of the computer running the software, or the video segment may be sent to another location for hosting, such as the PC server 12. In one embodiment, the video segments may be stored on and retrieved from one or more of the IP cameras 18.

In some embodiments, the initiating of recording, the stopping of the recording, and the buffering and other processing of the video segments may be done on a single computing platform or terminal. Once the video segment is complete, it may be copied or transferred to another computing platform, such as a web server, to be made available to users. The initiating, stopping, and processing of a recording may require more computing and/or processing power than some devices have available. For example, high quality video such as high definition (HD) or 4 k video may require more computing power than some inexpensive and/or small devices have available. Accordingly, in some embodiments, the initiating and stopping of the recording may be performed on one device in the form of start and stop time markers or positions, which are then forwarded to another device, which may have more computing power. The second device (e.g., PC, server, or other computing platform) may stream the event and use the start and stop time markers to generate the video segments, which may then be accessed directly or may be sent to a video server for distribution. The use of logical start/stop markers may therefore allow less powerful devices to emulate a terminal, while using a more powerful computing platform to do the more intense processing.

In another embodiment, video segments may be generated at a later time using a batch process. A terminal computing platform (e.g., a smart phone/watch, tablet, PC, etc.) may be used to input start and end markers or times for each video segment. The entire event (or portions thereof) may be recorded on the same or a different computing platform. The collection of start and end markers may then be processed into discrete video segments at a later time in a sequential or parallel manner. The collection of start and end markers may be batch processed on the same device used to collect them, or the collection may be sent to another device for processing (e.g., a host computer with more processing power than the terminal). The start and end markers may be collected for an entire event and then processed as a whole, or a certain number of start and end markers may be collected and processed. Accordingly, there may be a single batch (e.g., a whole game) or multiple batches (e.g., after each period, halftime, intermission, etc.) for a single event.

When the next play is about to begin (e.g., the players break the huddle) the operator may initiate recording again and a new segment is created and recorded according to the same process. If the play mode changes, for example, if a turnover occurs or a team scores or has to punt, the operator selects the new appropriate play mode (e.g., from the play mode pull down 42). Successive recording sessions may then be written to the directory for the appropriate play mode. The play mode may define a record path suffix.

An operator may therefore control the starting and stopping of the recording throughout a game or event, only recording segments of video that are desired or important. In addition to manual starting and stopping of recordings, the start and stop may be tied to events or clocks being used in the sport or event. If the sport or event has a game clock or similar master time controller, the start and stop may be tied thereto. In football, for example, recording could start when the game clock starts and stop when the clock stops or recording could start when the play clock hits a predetermined number and stop when the play clock resets, or other combinations. The starting and stopping of the recording may also be done autonomously according to what is happening on the field or during the event. For example, software on the camera (e.g., edge detection software) may recognize when a huddle starts or breaks or when a referee steps onto the field or makes a certain motion. The recorded files may be organized by play mode (e.g., offense, defense, etc.) and may include a sequential number as a prefix, suffix, or other positional data. The files may include other information in the file name, such as a time and/or date stamp, as well.

When a user on a client device 20 wants to view a recorded video segment, they can use media player software on the client device 20 to access the game or event recordings. The software may include an HTML 5 application having a web interface, which may run on a PC, Apple, Android, iPad, iPhone, Linux, and virtually every other type of device. The user(s) may select from a list of games/events, which may include the game or event that is currently being streamed/recorded. The user may select to view only a subset of recordings, for example, based on the play mode (e.g., offense, defense, etc.). As discussed above, the recordings may include prefixes and suffixes that may correspond to play order/number, play type, time, date, or other indicators.

The user(s) may then select a video segment (e.g., a play) and view the recording on the client device 20. As soon as a video segment is stored, it may be available to the users on the client devices. Accordingly, users (e.g., coaches or players) may instantly recall the last play (or any other play) on the sidelines, in a coaching booth, or elsewhere. The client devices may be notified that a new play is ready, for example, with an audible sound, vibration of the device, a visual alert, other alerts, or a combination thereof. The alert may be substantially instant, such as within a second of the finishing of the recording. Recordings may also be automatically queued up and/or displayed on the client device, such as the last record play/event. Multiple client devices 20 may be used simultaneously, and they may view the same plays or different plays at any time.

In at least one embodiment, the video is recorded in a temporal file format. In one embodiment, the video is recorded in H.264 or MPEG4 (MP4). The video segment files may be native MP4 and playback on any device supporting MP4, which is an industry standard. Other file formats may also be used, such as MJPEG or other encoded formats. In some embodiments, non-temporal file formats may be used.

Temporal video, such as H.264, may provide smaller file sizes relative to non-temporal video. Temporal video may therefore allow for longer recording and reduced memory requirements. Smaller file sizes may also improve the user experience for users on devices without a high-speed internet connection (e.g., Edge or 3G). However, there are significant challenges when trying to request mid-stream recording in a temporal format of a video that is already streaming. As known by one of ordinary skill in the art, temporal video uses data compression algorithms that use at least two different frame types, including "I-frames" and "P-frames." I-frames (also called intra coded or key frames) contain a substantially complete frame or image, and do not reference other frames. P-frames (also called predicted frames) may reference other frames and contain incomplete frames that do not provide a full image by themselves. P-frames may include, for example, only image data that has changed since the last I or P-frame. Therefore, an algorithm may specify that each I-frame is followed by a certain number of P-frames and then a new I-frame. The number of P-frames between I-frames may change depending on what is being recorded. The P-frames may be used to reconstruct the motion of the preceding I-frame to create a full image. This system allows for increased data compression and, therefore, lower file sizes. Other frame types may also be included in temporal video, such as B-frames (bi-directional predicted frames), and may be buffered in a similar manner to P-frames.

Figure 7:
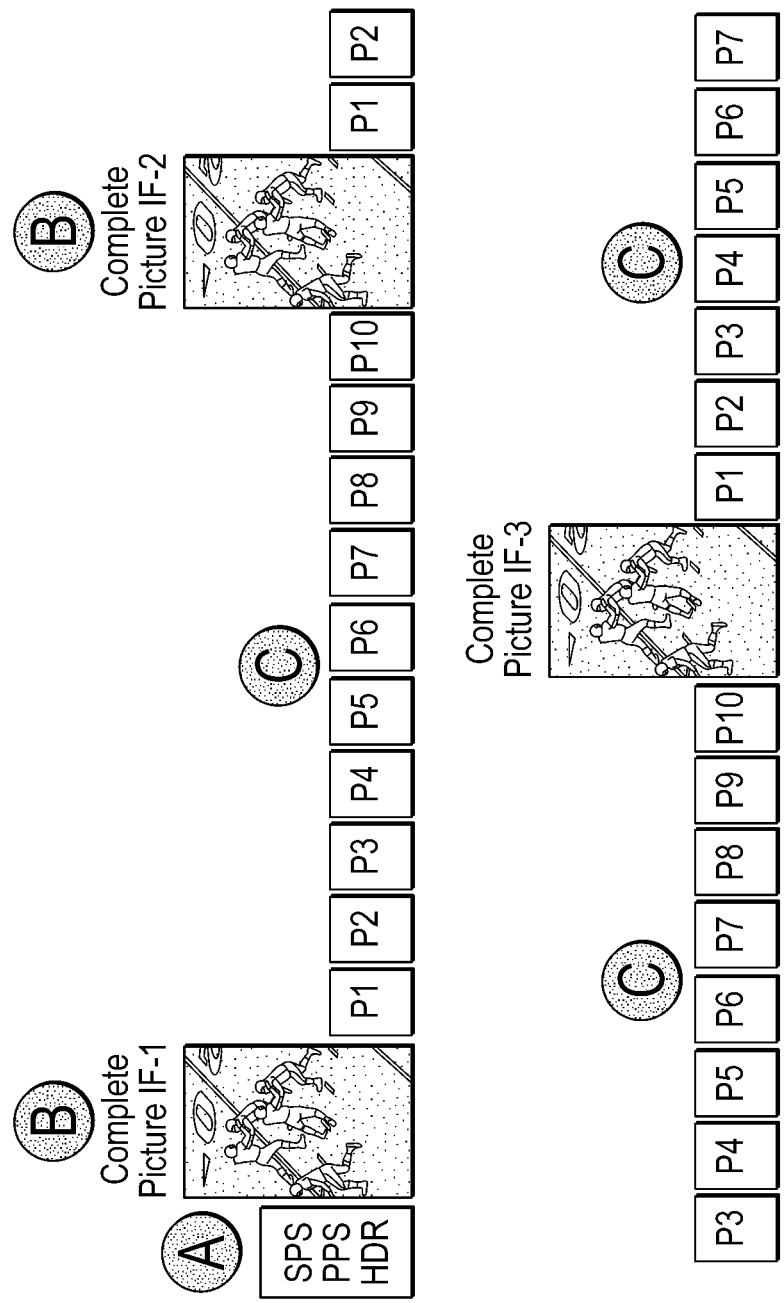
FIG. 7 is a schematic of the frame sequence in a temporal video segment, according to an embodiment.

The I and P-frames may cause a significant problem when trying to record temporal video mid-stream. An example of a video stream is shown in FIG. 7, where point A represents the Sequence Parameter Set (SPS) and Picture Parameter Set (PPS) header information, each point B represents an I-frame and each point C represents a collection of P-frames. Points D and E represent the initiating and ending of a recording, respectively. Recordings initiated midstream, such as at frame P8 between IF-2 and IF-3, will be missing the required prior I-frame IF-2 and P-frames P1-P7. Therefore, the recording will show corrupted video or no video at all until the next I-frame arrives. For example, if recording was started at P8 in the sequence show in FIG. 7, then the previous 7 P-frames and the preceding I-frame would all be lost. No image would be recorded until the next I-frame, IF-3. Depending on the algorithm and the subject matter being recorded, the next I-frame could be delayed by several seconds or longer, leading to a substantial amount of missed video. During this time, critical game events may be missed. Furthermore, for recordings that are initiated after the first I-frame has been discarded, the buffer would not include the header information A, which may render the entire video segment useless, since the header information is often a critical component of the stream.

One solution to this problem would be to record in non-temporal video formats, such as MJPEG, where video is discreet and contained in each frame. However, this leads to very large file sizes, which are not desirable and may prevent some users from viewing the recordings.

Another solution is to use a conventional buffer, such as a ring buffer. Conventional ring buffers have a fixed size and will therefore store a predetermined amount of data before dumping the data and starting over. Ring buffers are designed for applications such as security systems, where it may be desirable to capture "pre-alarm" images that occur prior to an alarm being tripped. In this way, a certain fixed length of time before the alarm is tripped may be recorded (e.g., a few seconds). This type of buffer will not work effectively for temporal recording because the buffer may fill up and dump the data that includes the preceding I-frame. Alternatively, if the buffer size is too large, the buffer may store many cycles of I and P-frames before dumping and would therefore store too large of a file and may include parts of the game or event action that were not intended to be recorded.

In one embodiment, a dynamic buffer 50 is provided which may buffer to memory the prior I-frame and P-frame data in a rolling buffer and concatenate it to the beginning of any recording that is about to be started, midstream. In one embodiment, the dynamic buffer 50 may be a single buffer, however, the buffer may be divided into two or more buffers. The Sequence Parameter Set (SPS) and Picture Parameter Set (PPS) header data may be stored in the dynamic buffer such that it can be added to the beginning of any video segment generated. In embodiments with a single dynamic buffer, the header data may be stored such that it is not written over when the buffer is flushed, thereby preserving the header data for each recorded segment. In embodiments where there are two or more dynamic buffers, a first dynamic buffer may be initially created to receive the header data and a second dynamic buffer may be created to buffer the I and P-frames of the streaming video.

Figure 8:
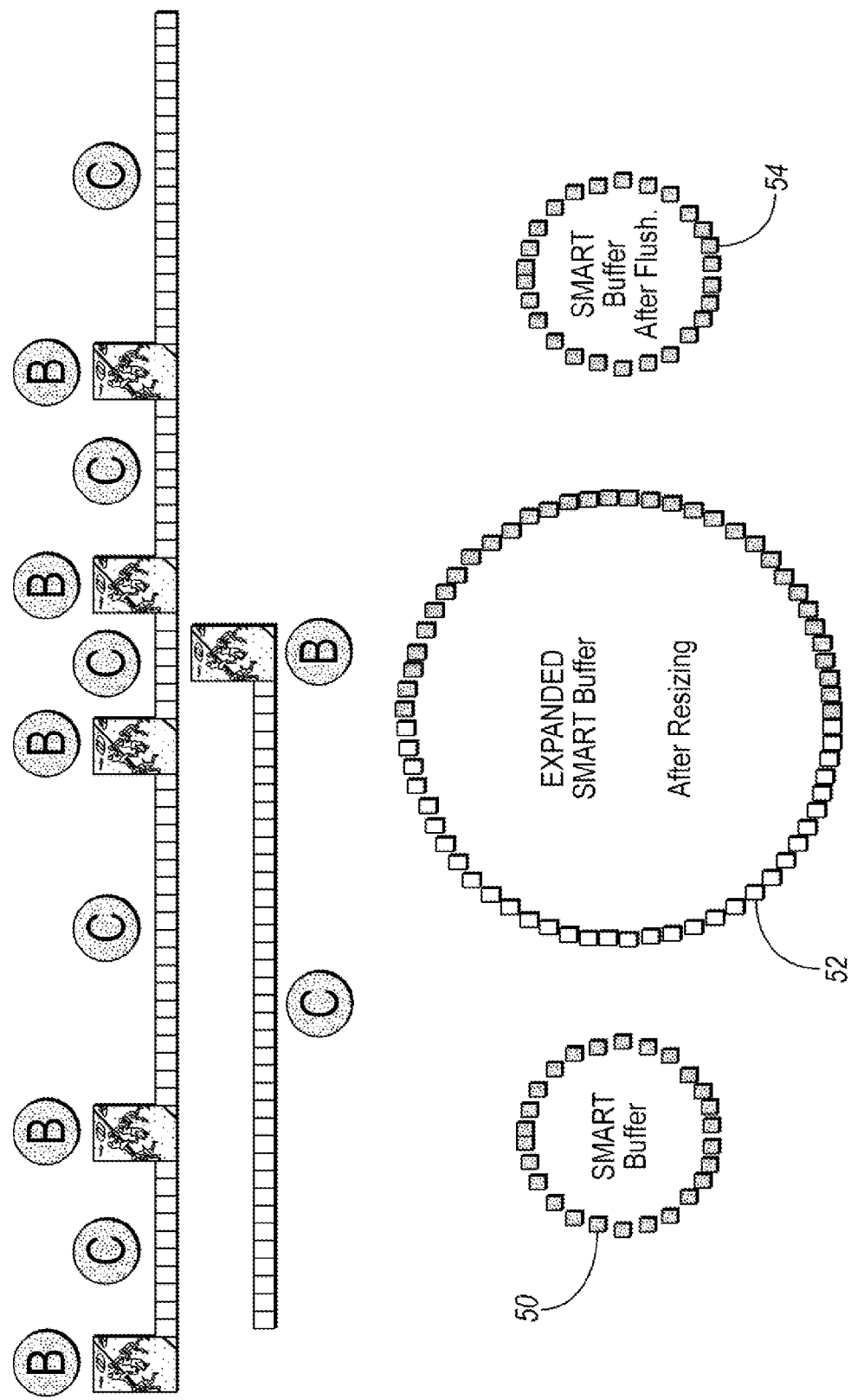
FIG. 8 is a schematic of a dynamic buffer, according to an embodiment.

The dynamic buffer may be configured to only collect the necessary frames needed to rebuild the video segment. The buffer may store an I-frame and all succeeding P-frames until a new I-frame occurs. The buffer is dynamic because it may shrink or grow, based on the number and/or varying size (e.g., in bytes) of the P-frames or other data types (e.g., B-frames), as illustrated in FIG. 8. The size of the buffer may also be adjusted based on the size of the I-frame preceding the P-frames (or other data types), the size/number of other streaming data, or a combination of any of the above parameters. The dynamic buffer 50 may begin storing P-frames and, as it approaches its capacity, may dynamically expand to a larger size 52 and allow additional P-frames to be stored until all necessary frames are buffered. When a new I-frame occurs, the dynamic buffer may be configured to dump all preceding frames and start over with the new I-frame and the succeeding P-frames. Since the video is streaming, but only recorded when desired, the only I-frame that is necessary to buffer is the one preceding the instant a user initiates recording. The dynamic buffer 50 may be configured to have an initial size 54, which it returns to after flushing. Alternatively, the buffer size may continuously change based on the space required and not return to a set size after flushing.

Figure 9:
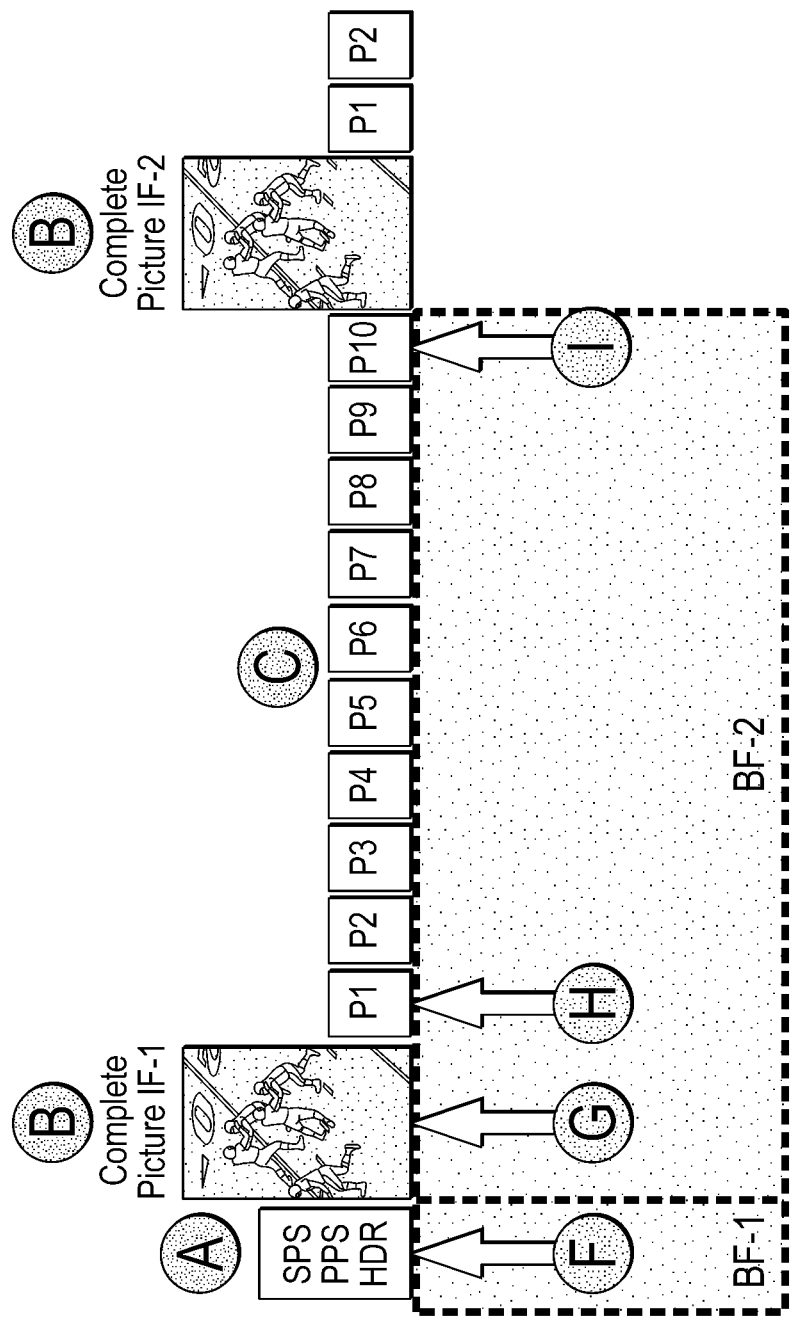
FIG. 9 is a schematic of a dynamic buffering system, according to an embodiment.
Figure 10:
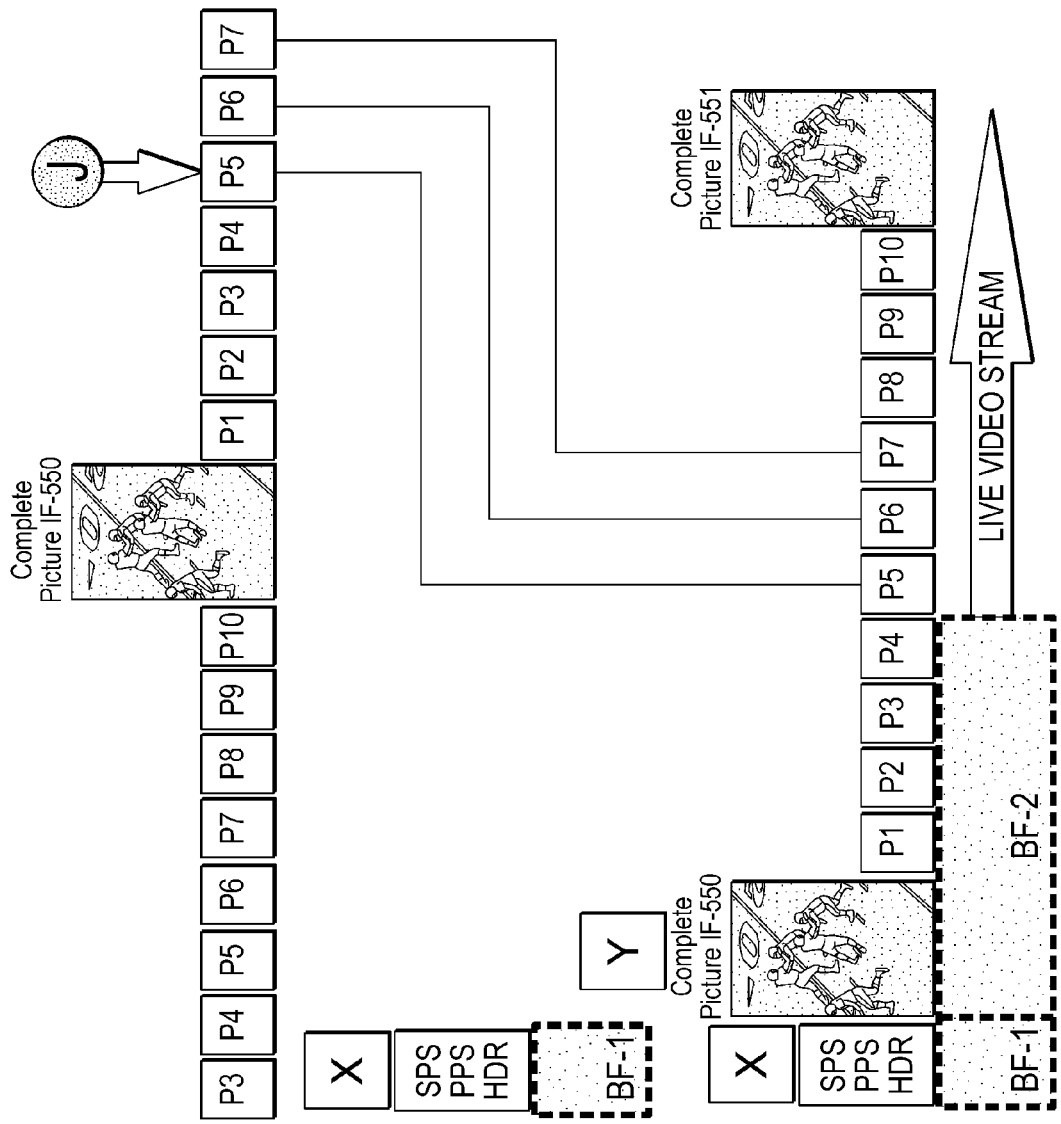
FIG. 10 is another schematic of a dynamic buffering system, according to an embodiment.

An example of a two-buffer system is shown in FIGS. 9 and 10. FIG. 9 illustrates how the buffer system works prior to the initiation of a recording (e.g., video is just being streamed). The first buffer BF-1 is configured to receive and store SPS and PPS header data at F. The second buffer BF-2 is configured to store I and P-frames. The second buffer BF-2 receives and stores the first I-frame IF-1 at G and begins receiving and storing subsequent P-frames at H until the final P-frame at I. Once a new I-frame is received, the previous I-frame IF-1 and P-frames P1-P10 are cleared from the memory and the process is repeated for IF-2 and the subsequent P-frames. The header data in BF-1 may be stored once and kept for the duration of the stream. If the streaming video changes in a manner that alters the header data, new header data may be received and stored in BF-1 and the previous header data may be cleared.

With reference to FIG. 10, after a number of sets of I and P-frames have been stored and cleared by the buffer system, recording may be requested by a user at J. The recording request is likely to occur during a P-frame, shown as P5. When recording is requested, the buffer system retrieves the header information from BF-1 and placed at the beginning of the recording at X. The previous I-frame IF-550 and subsequent P-frames P1-P4 up to the initiation of recording are retrieved from the second buffer BF-2 and placed in the recording after the header information at Y. The frame at which recording was initiated (P5) and the subsequent P-frames and I-frames are then added to the buffered frames as they occur to form a complete recording without missing I and P-frames at the beginning.

Figure 11:
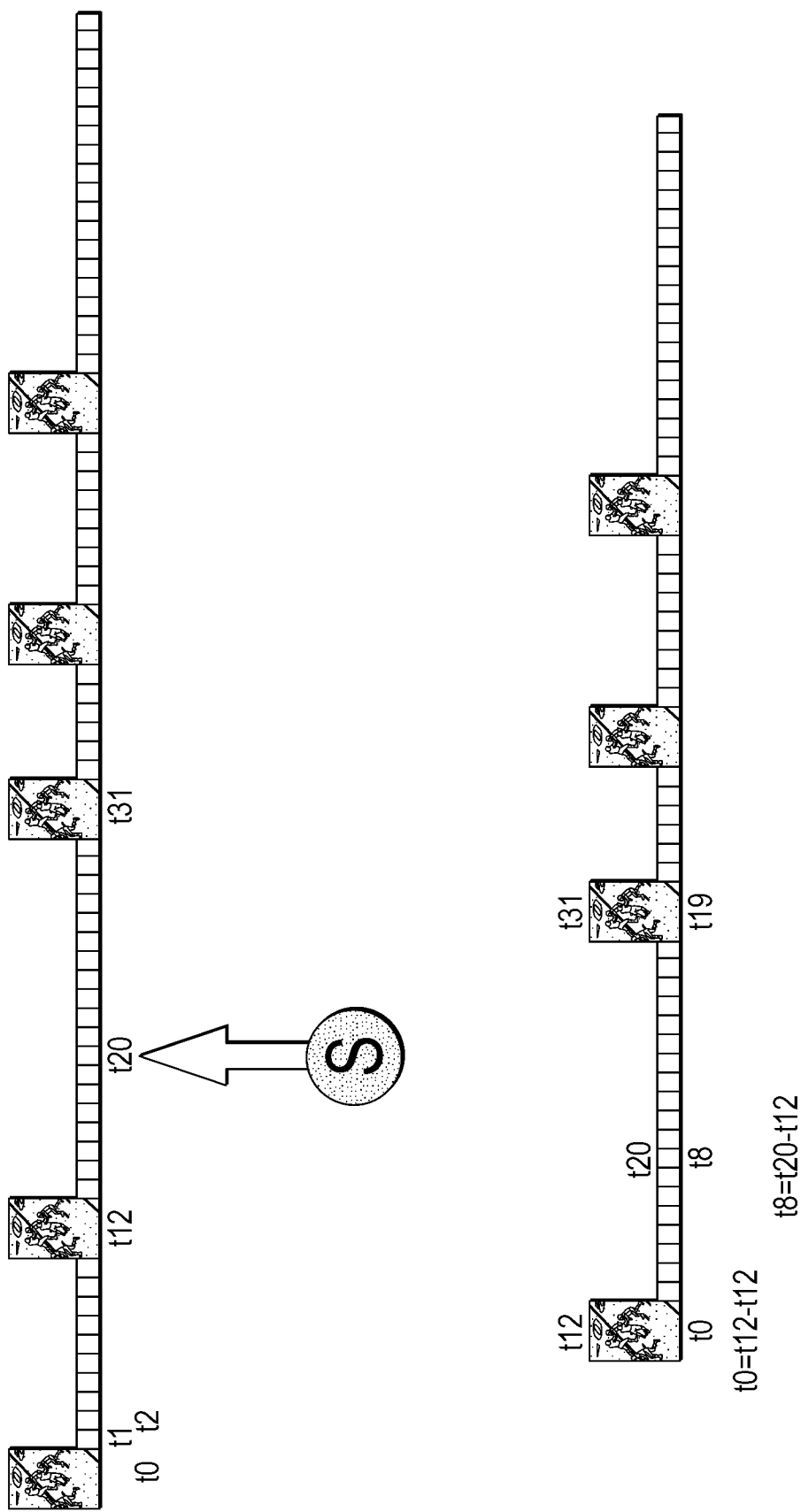
FIG. 11 is a schematic of temporal video time offset, according to an embodiment.

The UTC time offset may need to be recalculated for temporal video since the true start time is a short time (e.g., a number of ms) prior to the actual recording start time. Recalculating the offset may align the playback, improving video record quality/cadence and increasing smoothness by eliminating/mitigating recording jitter. In temporal video, each frame generally has associated therewith a time offset from the start of the initial stream. The time offset is typically measured in milliseconds, however, other units may be used. The offset value may be tied or zeroed to the first frame or it may be based on the time elapsed since an earlier reference date (for example, Jan. 1, 1904). As shown in FIG. 11, the first time offset may be assigned a time of t1, which is either 0 or the time from a reference date. If a recording is started at t=t20, then the time index of t20 is saved and the dynamic buffer lays down the PPS and SPS header information and frames t12 through t19 (the I and P-frames preceding the initiation of recording) and the video stream is continued, as described above. In order to have an accurate time offset, the initial reference needs to be reset to t0. In the example shown in FIG. 11, t0=t12−t12 and all subsequent frames recorded will have an adjusted time index of tx−t12 for the recorded video. For the example shown, the time index would be t8 (t20−t12).

The streaming and recording system described above may be highly effective for sports that tend to be "discontinuous" in nature (e.g., have many starts and stops). Examples of discontinuous sports may include football, tennis, golf, baseball, etc. In discontinuous sports, there may be natural breaking points where streaming video may be recorded in finite segments that can be easily cataloged. In football, for example, each play is discrete (i.e., has a definitive beginning and end) and each team is either on offense or defense, but not both (at least to start a play). Therefore, an operator of the system can easily start and stop a recording at the beginning and end of each play and the recording can be categorized based on factors like offense/defense, down number, quarter, etc. Similarly, for baseball, each at-bat is a discrete event, each team is either batting or fielding, and plays could be categorized based on inning, out number, hitting/fielding, etc.

Not all sports are discontinuous, however, and may not have natural start and stopping points for an operator to initiate and end recordings. These sports may be called "continuous," and may include sports such as soccer, lacrosse, hockey, etc. In continuous sports, which team is on offense or defense may change constantly and/or without stoppages or designated intervals. Recordings of continuous sports may be done, as described above, but may be more difficult to categorize due to the reduced number of defined stoppages and/or more fluid changes in possession or role. Accordingly, it may be difficult for an operator to start and stop a recording of a video stream, since they may not know when an important event is going to happen. It may, however, still be useful to have instantly available discrete recordings of gameplay for replay or for analysis by coaches and/or players (e.g., on the sideline, in the locker room, on the bench, etc.).

In addition to streaming video of the game or event and only recording discrete segments, such as described above, in another embodiment, the entire game or event may be recorded. For continuous sports, therefore, the entire game or event may be recorded and smaller segments, or sub-recordings, may be generated instantaneously as the game or event happens. These sub-recordings may then be distributed to the client devices in a similar manner as described above for discontinuous sports. This process may also be used for discontinuous sports.

However, generating sub-recordings from an ongoing recording is not possible using conventional temporal recording techniques. Temporal video, such as MP4, is composed of discrete units, called atoms. Included in the atoms are the "mdat" atom, which generally includes the actual audio and video information, and the "moov" atom, which generally includes structural or header information about the file, such as duration, dimensions, sample information, and other metadata. Both the mdat and moov atoms are required in order for a video player to play a video file. However, the mdat and/or moov atoms may only include accurate information upon a file closure or after the file is written. Therefore, if a segment is started in the middle of a recording or ended before the end of a recording, the segment will not include the mdat and/or moov atoms necessary for the segment to be played back. Accordingly, such incomplete segments could not be played by a user from a client device while the game or event is still ongoing (and therefore still being recorded).

In one embodiment, playable sub-recordings may be generated as the game or event is being recorded by generating stand-alone synthetic sub-recordings with mdat and moov data. Accordingly, even if the mdat and/or moov data for the entire game or event recording has not been written yet, the synthetic sub-recordings will have mdat and moov data and will therefore be playable by a user on a client device. An operator of the system may watch or monitor the game or event, similar to an operator monitoring the streaming video for a discontinuous sport, and may designate "start" and "stop/end" times. The system may then copy the video segment of the recording corresponding to the start and end times and insert the mdat and moov data to generate the stand-alone sub-recording.

As discussed above, continuous sports, by their nature, are not easily broken into discrete segments. In addition, it is not always possible to anticipate when an important event will occur. In football, a discontinuous sport, it is certain that the important action will occur during a discrete play (e.g., between the players breaking the huddle and the play ending in a tackle, score, turnover, etc.). However, in a continuous sport, like soccer, there may be stretches of time where no scoring or otherwise significant action occurs and then there is a sudden flurry of activity. Since there may be no periodic or scheduled breaks in the action, an operator may not be able to anticipate when to designate a start and/or end time for a sub-recording. Accordingly, the system may allow the operator to designate an end time and then copy a portion of the recording corresponding to a certain amount of time prior to the end time to generate the sub-recording. For example, if a team scores a goal in soccer, the operator may indicate an end time after the goal is scored and then choose to generate a sub-recording starting one minute prior to the end time in order to capture the goal itself and some of the build-up. If the operator wants to capture a longer period of time, for example if the play had a long build-up, he could choose a longer recording time, such as two or three minutes. The system may allow the user to select the length of each sub-recording every time the operator designates an end time. The system may also include pre-set times, such as 15 seconds, 30 seconds, 1:00, 1:30, 2:00, 2:30, 3:00, or any other potentially useful denomination. The pre-set times may be adjusted prior to or during a game or event.

While the system and methods of recording has been described above with reference to continuous and discontinuous sporting events or other events, they may be used in other applications, as well. For example, the system and methods may be applied to security systems. If a security system includes a security guard or other person that monitors live streaming feeds, the guard may start and stop recording of the streaming video, similar to the discontinuous sports/events above, if he sees something of interest transpiring. If there is no continuous monitoring, or as an additional backup to human monitoring, a security system may include sensors and/or motion sensing camera technology to start and end recording. For example, is a security camera detects motion, it could initiate recording of a streaming video or initiate recording of a sub-recording and continue recording until the motion stops or for a pre-determined amount of time and then end the recording. Similarly, if a window or door sensor, a smoke/fire detector, or other sensor is tripped, the system may initiate recording and continue for as long as the tripping activity continues or for a pre-determined amount of time. In addition, the system may use the detection of an event as an end point and generate a start point a certain period of time prior to the end point, such as a minute, two minutes, etc. (similar to continuous sports). Therefore, the cause of a detection event may be recorded.

A combination of the two methods may also be used. For example, if a door sensor is tripped, the system may initiate recording and maintain recording for a certain amount of time, such as five minutes. The system may also include a recording of a certain period of time prior to the sensor being tripper, for example, one minute. Accordingly, the cause of the sensor tripping (time prior to the "start point") may be recorded, as well as what happens after the sensor is tripped (time from the "start point" to the "end point"). Therefore, for a break-in, both how the intruder got in and what he does after may be recorded.

Similar to the sporting or other events, a user may access the recordings on a client device as soon as they are recorded. A user may therefore remotely review targeted security footage and decide if further action needs to be taken without scanning through hours of mostly uneventful video. In addition to security systems, other applications for the system and methods may include recording recurring events in the home, such as when a vehicle enters/exits the driveway or garage, when a dog/cat enters or exits a doggy door, a delivery is made to the door or mail is delivered, children leave or arrive from school or other activities, etc. The recordings may be sent to a client device (e.g., emailed, texted, pushed, etc.) or accessed remotely via a browser or other internet-enabled device. Numerous commercial or industrial applications are also possible with the system and methods, such as tracking deliveries and receivables, monitoring arrival and departure times, or others. Similar to the home applications, recordings may be sent, pushed, or otherwise accessed by managers or business owners.

To provide additional context for various aspects of the present disclosure, the following discussion is intended to provide a brief, general description of a suitable computing environment in which the various aspects of the disclosure may be implemented. While one or more embodiments of the disclosure relates to the general context of computer-executable instructions that may run on one or more computers, those skilled in the art will recognize that the subject matter also may be implemented in combination with other program modules and/or as a combination of hardware and software.

Generally, program modules include routines, programs, components, data structures, etc., that perform particular tasks or implement particular abstract data types. Moreover, those skilled in the art will appreciate that aspects of the inventive methods may be practiced with other computer system configurations, including single-processor or multi-processor computer systems, minicomputers, mainframe computers, as well as personal computers, hand-held wireless computing devices, microprocessor-based or programmable consumer electronics, and the like, each of which can be operatively coupled to one or more associated devices. Aspects of the disclosure may also be practiced in distributed computing environments where certain tasks are performed by remote processing devices that are linked through a communications network. In a distributed computing environment, program modules may be located in both local and remote memory storage devices.

A computer may include a variety of non-transitory computer readable media. Non-transitory computer readable media may be any available media, except for a transitory, propagating signal, that can be accessed by the computer and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which may be used to store the desired information and which may be accessed by the computer.

An exemplary environment for implementing various aspects of the present disclosure may include a computer that includes a processing unit, a system memory and a system bus. The system bus couples system components including, but not limited to, the system memory to the processing unit. The processing unit may be any of various commercially available processors. Dual microprocessors and other multi-processor architectures may also be employed as the processing unit.

The system bus may be any of several types of bus structure that may further interconnect to a memory bus (with or without a memory controller), a peripheral bus, and a local bus using any of a variety of commercially available bus architectures. The system memory may include read only memory (ROM) and/or random access memory (RAM). A basic input/output system (BIOS) is stored in a non-volatile memory such as ROM, EPROM, EEPROM, which BIOS contains the basic routines that help to transfer information between elements within the computer, such as during start-up. The RAM may also include a high-speed RAM such as static RAM for caching data.

The computer may further include an internal hard disk drive (HDD) (e.g., EIDE, SATA), which internal hard disk drive may also be configured for external use in a suitable chassis, a magnetic floppy disk drive (FDD), (e.g., to read from or write to a removable diskette) and an optical disk drive, (e.g., reading a CD-ROM disk or, to read from or write to other high capacity optical media such as the DVD). The hard disk drive, magnetic disk drive and optical disk drive may be connected to the system bus by a hard disk drive interface, a magnetic disk drive interface and an optical drive interface, respectively. The interface for external drive implementations includes at least one or both of Universal Serial Bus (USB) and IEEE 1394 interface technologies.

The drives and their associated computer-readable media may provide nonvolatile storage of data, data structures, computer-executable instructions, and so forth. For the computer, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the present disclosure.

A number of program modules may be stored in the drives and RAM, including an operating system, one or more application programs, other program modules and program data. All or portions of the operating system, applications, modules, and/or data may also be cached in the RAM. It is appreciated that the subject matter of the present disclosure may be implemented with various commercially available operating systems or combinations of operating systems.

It is within the scope of the disclosure that a user may enter commands and information into the computer through one or more wired/wireless input devices, for example, a touch screen display, a keyboard and/or a pointing device, such as a mouse. Other input devices may include a microphone (functioning in association with appropriate language processing/recognition software as known to those of ordinary skill in the technology), an IR remote control, a joystick, a game pad, a stylus pen, or the like. These and other input devices are often connected to the processing unit through an input device interface that is coupled to the system bus, but may be connected by other interfaces, such as a parallel port, an IEEE 1394 serial port, a game port, a USB port, an IR interface, etc.

A display monitor or other type of display device may also be connected to the system bus via an interface, such as a video adapter. In addition to the monitor, a computer may include other peripheral output devices, such as speakers, printers, etc.

The computer may operate in a networked environment using logical connections via wired and/or wireless communications to one or more remote computers. The remote computer(s) may be a workstation, a server computer, a router, a personal computer, a portable computer, a personal digital assistant, a cellular device, a microprocessor-based entertainment appliance, a peer device or other common network node, and may include many or all of the elements described relative to the computer. The logical connections depicted include wired/wireless connectivity to a local area network (LAN) and/or larger networks, for example, a wide area network (WAN). Such LAN and WAN networking environments are commonplace in offices, and companies, and facilitate enterprise-wide computer networks, such as intranets, all of which may connect to a global communications network such as the Internet.

The computer may be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi (such as IEEE 802.11x (a, b, g, n, etc.)) and Bluetooth™ wireless technologies. Thus, the communication may be a predefined structure as with a conventional network or simply an ad hoc communication between at least two devices.

The system may also include one or more server(s). The server(s) may also be hardware and/or software (e.g., threads, processes, computing devices). The servers may house threads to perform transformations by employing aspects of the present disclosure, for example. One possible communication between a client and a server may be in the form of a data packet adapted to be transmitted between two or more computer processes. The data packet may include a cookie and/or associated contextual information, for example. The system may include a communication framework (e.g., a global communication network such as the Internet) that may be employed to facilitate communications between the client(s) and the server(s).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A computer system for recording a number of segments of a discontinuous activity comprising a computer having non-transitory memory for storing machine instructions that are to be executed by the computer, the machine instructions when executed by the computer implement the following functions:
    streaming temporal video of the discontinuous activity to obtain a streamed temporal video having a current incomplete segment;
    dynamically buffering the current incomplete segment to store data associated thereto and a current incomplete segment buffer;
    receiving first and second inputs to obtain start and end time markers for a first segment of the number of segments;
    continuously recording the streamed temporal video based on receipt of the first input and until receipt of the second input to obtain a raw recorded first video segment; and
    generating a recorded first video segment based on the raw recorded first video segment and the current incomplete segment data;
    wherein dynamically buffering includes buffering an I-frame and one or more P-frames of a number of P-frames, the I-frame having an associated I-frame time marker and the one or more P-frames having one or more associated P-frame time markers and the P-frames having associated time markers between the I-frame and the start time marker are included in the current incomplete segment.

2. The system of claim 1, wherein the functions further comprise buffering header information of the streamed temporal video and including the header information in the recorded first video segment.

3. The system of claim 1, wherein only a most recent I-frame relative to the start time marker is dynamically buffered.

4. The system of claim 1, wherein the functions further comprise clearing the current incomplete segment buffer when a new I-frame is generated.

5. The system of claim 1, wherein dynamically buffering includes expanding or contracting a size of the current incomplete segment buffer based on a size of or the number of P-frames.

6. The system of claim 5, wherein the functions further comprise returning the size of the current incomplete segment buffer to an initial size after it has been cleared.

7. The system of claim 1, wherein the functions further comprise adjusting a time offset of the recorded first video segment.

8. A method comprising:
    streaming temporal video to obtain a streamed temporal video having a current incomplete segment;
    receiving a start time marker; and
    dynamically buffering the current incomplete segment to store data associated thereto and a current incomplete segment buffer;
    the dynamically buffering step including buffering an I-frame and one or more P-frames of a number of P-frames, the I-frame having an associated I-frame time marker and the one or more P-frames having one or more associated P-frame time markers and the P-frames having associated time markers between the I-frame and the start time marker are included in the current incomplete segment;
    wherein dynamically buffering includes expanding or contracting a size of the current incomplete segment buffer based on a size of or the number of P-frames or a size of the I-frame.

9. The method of claim 8, further comprising buffering header information of the streamed temporal video.

10. The method of claim 8, further comprising:
    receiving first and second inputs to obtain start and end time markers for a first video segment;
    continuously recording the streamed temporal video based on receipt of the first input and until receipt of the second input to obtain a raw recorded first video segment; and
    generating a recorded first video segment based on the raw recorded first video segment and the current incomplete segment data.

11. The method of claim 10, wherein the functions further comprise adjusting a time offset of the recorded first video segment.

12. The method of claim 8, wherein only a most recent I-frame relative to the start time marker is dynamically buffered.

13. The method of claim 8, further comprising clearing the current incomplete segment buffer when a new I-frame is generated.

14. The method of claim 8, further comprising returning the size of the current incomplete segment buffer to an initial size after it has been cleared.

15. A computer system comprising a computer having non-transitory memory for storing machine instructions that are to be executed by the computer, the machine instructions when executed by the computer implement the following functions:
    streaming temporal video to obtain a streamed temporal video having a current incomplete segment;
    receiving a start time marker; and
    dynamically buffering the current incomplete segment to store data associated thereto and a current incomplete segment buffer;
    the dynamically buffering step including buffering an I-frame and one or more P-frames of a number of P-frames, the I-frame having an associated I-frame time marker and the one or more P-frames having one or more associated P-frame time markers and the P-frames having associated time markers between the I-frame and the start time marker are included in the current incomplete segment;
    wherein dynamically buffering includes expanding or contracting a size of the current incomplete segment buffer based on a size of or the number of P-frames or a size of the I-frame.

16. The system of claim 15, wherein the functions further comprise returning the size of the current incomplete segment buffer to an initial size after it has been cleared.

17. The system of claim 15, wherein only a most recent I-frame relative to the start time marker is dynamically buffered.

18. The system of claim 15, wherein the functions further comprise clearing the current incomplete segment buffer when a new I-frame is generated.

19. A computer system comprising a computer having non-transitory memory for storing machine instructions that are to be executed by the computer, the machine instructions when executed by the computer implement the following functions:
    streaming temporal video to obtain a streamed temporal video having a current incomplete segment;

receiving a start time marker;

dynamically buffering the current incomplete segment to store data associated thereto and a current incomplete segment buffer;

the dynamically buffering step including buffering an I-frame and one or more P-frames of a number of P-frames and expanding or contracting a size of the current incomplete segment buffer based on a size of or the number of P-frames;

receiving first and second inputs to obtain the start time marker and an end time marker for a first video segment;

continuously recording the streamed temporal video based on receipt of the first input and until receipt of the second input to obtain a raw recorded first video segment; and generating a recorded first video segment based on the raw recorded first video segment and the current incomplete segment data.

20. The system of claim 19, wherein the I-frame has an associated I-frame time marker and the one or more P-frames have one or more associated P-frame time markers and the P-frames having associated time markers between the I-frame and the start time marker are included in the current incomplete segment.

21. The system of claim 19, wherein only a most recent I-frame relative to the start time marker is dynamically buffered.

22. A method comprising:

streaming temporal video of an event to obtain a streamed temporal video having a current incomplete segment;

receiving first and second inputs to obtain start and end time markers for a first video segment, the start and end time markers being associated with a start and end of a segment of the event;

dynamically buffering the current incomplete segment to store data associated thereto and a current incomplete segment buffer, the dynamic buffering including buffering an I-frame and one or more P-frames of a number of P-frames, the I-frame having an associated I-frame time marker and the one or more P-frames having one or more associated P-frame time markers and the P-frames having associated time markers between the I-frame and the start time marker are included in the current incomplete segment;

continuously recording the streamed temporal video based on receipt of the first input and until receipt of the second input to obtain a raw recorded first video segment;

generating a recorded first video segment based on the raw recorded first video segment and the current incomplete segment data; and distributing the recorded first video segment to a remote device over a network.

23. The method of claim 22, wherein dynamically buffering includes expanding or contracting a size of the current incomplete segment buffer based on a size of or the number of P-frames or a size of the I-frame.

* * * * *